(No Model.)

J. H. ECKART.
NUT LOCK.

No. 603,324.

Patented May 3, 1898.

WITNESSES:
Alfred A. Mathey
E. Elliott

INVENTOR
John H. Eckart.
BY
Hallett & Hallett
ATTORNEYS.

THE NORRIS PETERS CO., PHOTO-LITHO., WASHINGTON, D. C.

UNITED STATES PATENT OFFICE.

JOHN H. ECKART, OF JOPLIN, MISSOURI.

NUT-LOCK.

SPECIFICATION forming part of Letters Patent No. 603,324, dated May 3, 1898.

Application filed December 13, 1897. Serial No. 661,745. (No model.)

*To all whom it may concern:*

Be it known that I, JOHN H. ECKART, a citizen of the United States, residing at Joplin, in the county of Jasper and State of Missouri, have invented certain new and useful Improvements in Nut-Locks, of which the following is a full, clear, and exact description, reference being had to the accompanying drawings, forming a part hereof.

My invention has relation to improvements in nut-locks; and it consists in the novel combination and arrangement of parts more particularly described in the specification and pointed out in the claims.

Figure 1:
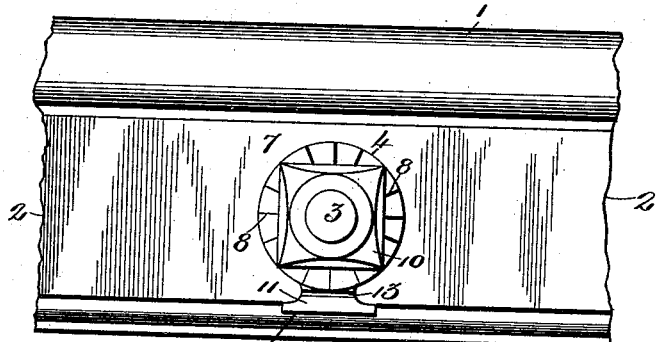
Figure 2:
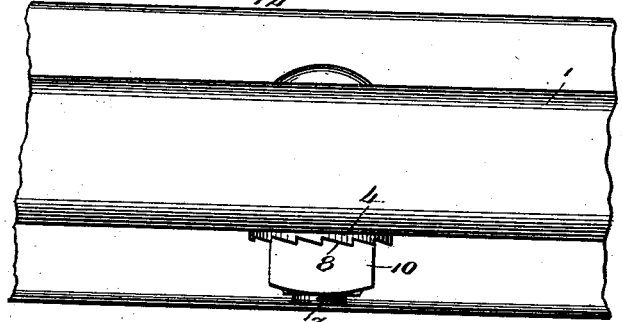
Figure 3:
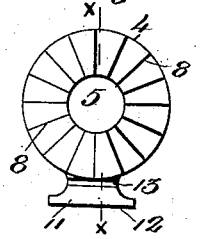
Figure 4:
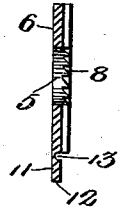
Figure 5:
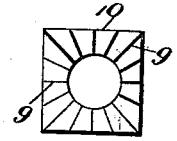

In the drawings, Figure 1 is a side elevation of my complete invention as applied to the rail and fish-plates. Fig. 2 is a top plan view of the same. Fig. 3 is a front view of the washer which I employ in carrying out my invention. Fig. 4 is a vertical longitudinal section taken on the line *x x* of Fig. 3. Fig. 5 is a rear elevation of the nut or that surface that comes in contact with the washer.

The object of my invention is to construct a washer and nut in such a manner that when the nut is turned against the washer the nut will be automatically locked, and thus prevented from being turned in the opposite direction or loosened under the constant vibration of the rails; and it consists of an ordinary bolt which is adapted to be passed through suitable openings in the fish-plates and rail in the well-known manner, a washer provided with an opening for receiving the bolt and having radially-arranged ratchet-teeth formed on one of its faces or that face with which the nut comes in contact, a base or foot portion formed integral with the washer and adapted to come in contact with the upper surface of the base of the rail, a groove formed or cut a suitable depth, the metal left by said groove, which connects the washer and foot portion, being comparatively weakened, whereby the foot portion may be readily severed from the washer for removing the nut, the said foot portion preventing the washer from being turned when the nut is screwed against the said washer, and thus preventing the nut from turning off the bolt, a nut the engaging face of which is also provided with radially-arranged ratchet-teeth which coöperates with the ratchet-teeth on the washer, and in other details now to be specifically described.

In the drawings, 1 represents an ordinary rail, 2 the fish-plate, and 3 a bolt, all of which are of the ordinary construction.

The washer 4, which forms a part of the nut-lock, is circular and provided with a central opening 5 of such a size as to be readily passed over the screw-threaded end of the bolt 3 and its plane surface 6 brought in contact with the vertical plane surface 7 of the fish-plate 2. The opposite or outer surface of the washer 4 is provided with radially-arranged ratchet-teeth 8, with which coöperate the radially-arranged ratchet-teeth 9, formed on one side of the nut 10, when the latter is turned against said washer in drawing and holding the several parts together. Formed integral with the washer 4 is a base or foot portion 11, having a lower straight edge 12, which comes in contact with the upper edge of the base of the rail 1 when the washer is passed over the bolt and is in proper position with the fish-plate 2, as shown in Fig. 1, for preventing the washer from being turned when the nut is screwed against the same, thus thoroughly locking the nut against rotation.

13 represents a groove which is formed or cut a suitable depth where the washer 4 and foot portion unite, the metal left being comparatively thin in order that the said foot portion may be easily severed from the washer when it is desired to remove the nut, a chisel or other suitable instrument being driven between the foot portion and the fish-plate, whereby the said foot portion will either break off of the washer or bend outwardly, according to the character of the metal of which the same is made. In either instance, however, the foot portion being out of contact with the base of the rail the nut and washer can easily be simultaneously turned and both removed from the bolt.

It will be readily seen that the bolt and nut is never disabled in applying and removing the same, the washer being the only part that is at all destroyed, which can be manufactured at a very nominal cost.

Having fully described my invention, what I claim is—

1. A nut-lock, comprising an ordinary bolt, a circular washer having a rear smooth surface, ratchet-teeth formed on the opposite surface of the same, a foot portion formed integral with said washer, a groove formed between the washer and foot portion, whereby the metal is reduced, and a nut having a ratchet formed on its engaging surface, and adapted to coöperate with the ratchet-teeth formed on the washer, substantially as described.

2. A nut-lock, comprising an ordinary rail and fish-plate, a bolt passing through the same, a circular washer having a central opening for receiving the bolt, radially-arranged ratchet-teeth formed on the outer surface of said washer, a foot portion formed integral with the washer and having a straight lower surface which comes in contact with the base of the rail, a groove formed in the metal between the washer and foot whereby the metal is reduced, and a nut having radially-arranged ratchet-teeth formed on one of its faces which coöperate with the ratchet-teeth formed on the washer, substantially as described.

In testimony whereof I affix my signature in presence of two witnesses.

JOHN H. ECKART.

Witnesses:
ALFRED A. MATHEY,
C. F. KELLER.